(12) United States Patent
Kim et al.

(10) Patent No.: US 11,610,521 B2
(45) Date of Patent: Mar. 21, 2023

(54) LED DRIVING DEVICE AND LED DRIVING METHOD

(71) Applicant: SILICON WORKS CO., LTD., Daejeon (KR)

(72) Inventors: Ji Hwan Kim, Daejeon (KR); Jong Min Lee, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 0 days.

(21) Appl. No.: 17/377,183

(22) Filed: Jul. 15, 2021

(65) Prior Publication Data

US 2022/0028310 A1  Jan. 27, 2022

(30) Foreign Application Priority Data

Jul. 21, 2020 (KR) .................. 10-2020-0090201

(51) Int. Cl.
*G09G 3/00* (2006.01)
*H05B 45/50* (2022.01)
*H05B 45/10* (2020.01)
*G09G 3/32* (2016.01)

(52) U.S. Cl.
CPC .............. *G09G 3/006* (2013.01); *G09G 3/32* (2013.01); *H05B 45/10* (2020.01); *H05B 45/50* (2020.01); *G09G 2300/0842* (2013.01); *G09G 2320/064* (2013.01); *G09G 2330/04* (2013.01); *G09G 2330/12* (2013.01)

(58) Field of Classification Search
CPC ............... G09G 3/006; G09G 2330/04; G09G 2330/12; G09G 2320/029; H05B 45/50
See application file for complete search history.

(56) References Cited

U.S. PATENT DOCUMENTS

| 7,236,148 | B2 | 6/2007 | Yoshida et al. |
| 9,781,806 | B1 | 10/2017 | Yeh et al. |
| 2017/0154557 | A1* | 6/2017 | Shon ..................... G09G 3/3275 |
| 2019/0122616 | A1* | 4/2019 | Lee ....................... G09G 3/3266 |

* cited by examiner

*Primary Examiner* — Mark W Regn
(74) *Attorney, Agent, or Firm* — Rothwell, Figg, Ernst & Manbeck, P.C.

(57) ABSTRACT

The present disclosure relates to a technology for driving an LED, comprising sensing a forward-direction voltage of an LED and determining whether or not the LED is defective by comparing the forward-direction voltage with a comparative object voltage, wherein the comparative object voltage is continuously updated using a sensed forward-direction voltage so that the comparative object voltage may be set to be an unfixed value, that is, a value reflecting a current state of an LED. This allows a more accurate detection of a defect of an LED.

14 Claims, 9 Drawing Sheets

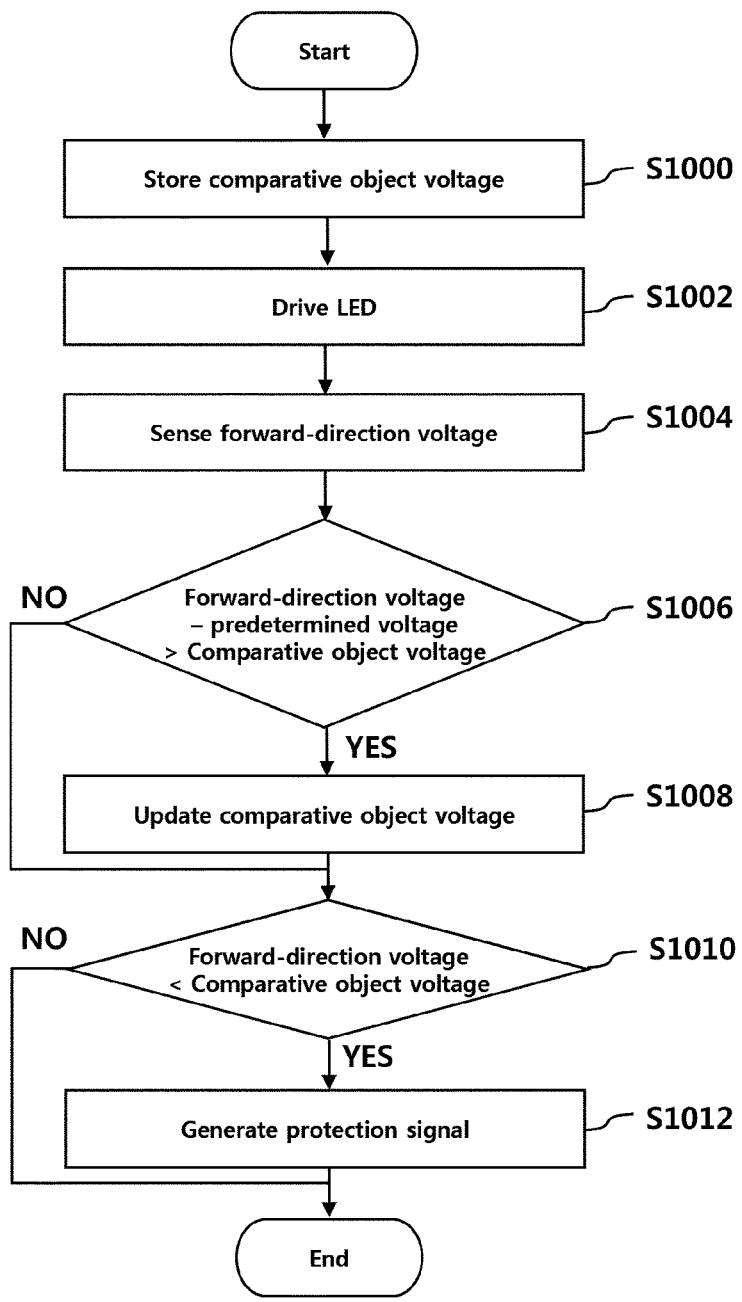

LED DRIVING DEVICE AND LED DRIVING METHOD

CROSS REFERENCE TO RELATED APPLICATION

This application claims priority from Republic of Korea Patent Application No. 10-2020-0090201, filed on Jul. 21, 2020, which is hereby incorporated by reference in its entirety.

BACKGROUND

1. Field of Technology

The present disclosure relates to a technology for driving a light emitting diode (LED).

2. Description of the Prior Art

As society becomes more and more information-oriented, various display devices for visualizing information are being developed. Liquid crystal display (LCD) devices, organic light emitting diode (OLED) display devices, plasma display panels (PDP), or the like are representative examples of display devices that have been developed thus far or are being developed. Such display devices are being developed in order to properly display high-resolution images.

However, although the aforementioned display devices have the advantage of having high-resolution, they have difficulties in being supersized. For example, OLED display devices, that have been developed thus far, have screen sizes of 80 inches (approximately 2 m of width), 100 inches (approximately 2.5 m of width), or the like. Such display devices are not adequate to be manufactured having more than 10 m of width.

To supersize display devices, interest in light emitting diode (LED) display devices is growing. According to an LED display device technology, one supersized panel can be made by a required number of modularized LED pixels being disposed thereon. Otherwise, according to the LED display device technology, one supersized panel structure can be made by comprising a required number of unit panels comprising a plurality of LED pixels. As such, the LED display device technology allows increasing the number of LED pixels as required to facilitate implementing a supersized display device.

An LED display device also has an advantage in diversifying the size of a panel as well as in supersizing a panel. According to the LED display device technology, the horizontal size and the vertical size of a panel can be diversified by appropriately disposing LED pixels.

Meanwhile, when a display device is enlarged or customized, costs of manufacturing the display device increases and the increase of the costs makes interest in maintenance of a display device grow. Accordingly, when some pixels of a display device are defective, it is more likely that a user of the display device, considering costs, would try to repair them or to prevent the defect from expanding to other pixels, instead of discarding the display device as before.

SUMMARY OF THE INVENTION

In this background, an aspect of the present disclosure is to provide a technology for detecting defects of pixels in a light emitting diode (LED) display device. Another aspect of the present disclosure is to provide a technology for determining a short circuit of a pixel in an LED display device. Still another aspect of the present disclosure is to provide a technology for detecting a pixel in an incomplete short circuit in an LED display device.

To this end, in an aspect, the present disclosure provides a light emitting diode (LED) driving device comprising: a driving circuit to drive a plurality of LEDs respectively in different times according to scan signals; and a protection circuit to sense a first voltage corresponding to a forward-direction voltage of a first LED among the plurality of LEDs in a first time, to sense a second voltage corresponding to a forward-direction voltage of a second LED among the plurality of LEDs in a second time, and to determine a state of the second LED using the first voltage and the second voltage.

In another aspect, the present disclosure provides a light emitting diode (LED) driving device comprising: a driving circuit to sequentially drive a plurality of pixels, each comprising an LED, by scan line; and a protection circuit to sense a voltage formed in a position of each pixel as a first voltage, to sense a highest voltage among first voltages for pixels as a second voltage via a path in which a voltage drop element is disposed, and to determine a state of each pixel by comparing the first voltage and the second voltage.

The protection circuit may input the first voltage and the second voltage into a comparator comprising a hysteresis loop and determine whether or not each pixel is defective according to an output from the comparator.

The driving circuit may comprise a switch to adjust brightness of each pixel according to a pulse width modulation (PWM) signal and the switch may be controlled to be turned on or off according to a signal in which a signal outputted from the comparator and the PWM signal are combined.

In still another aspect, the present disclosure provides an LED driving method, comprising: driving a plurality of LEDs respectively in different times using a channel; sensing a forward-direction voltage of each LED using the channel in every driving time; storing a comparative object voltage and, when the forward-direction voltage in one driving time is higher than the stored comparative object voltage by at least a predetermined voltage, updating the comparative object voltage using a voltage obtained by deducting the predetermined voltage from the forward-direction voltage in the one driving time; and comparing the forward-direction voltage with the comparative object voltage to determine a state of the LED.

The LED driving method may further comprise generating a protection signal when the LED is determined to be defective and identifying a position of an LED determined to be defective or storing the position by identifying a time point when the protection signal is generated.

As described above, the present disclosure allows detecting whether or not a pixel of an LED display device is defective. In addition, the present disclosure allows determining a short circuit of a pixel of an LED display device and detecting a pixel in a state of an incomplete short circuit.

BRIEF DESCRIPTION OF THE DRAWINGS

The above and other aspects, features, and advantages of the present disclosure will be more apparent from the following detailed description taken in conjunction with the accompanying drawings, in which:

FIG. 10 is a flow diagram of a method of driving an LED according to an embodiment.

DETAILED DESCRIPTION OF THE EXEMPLARY EMBODIMENTS

Figure 1:
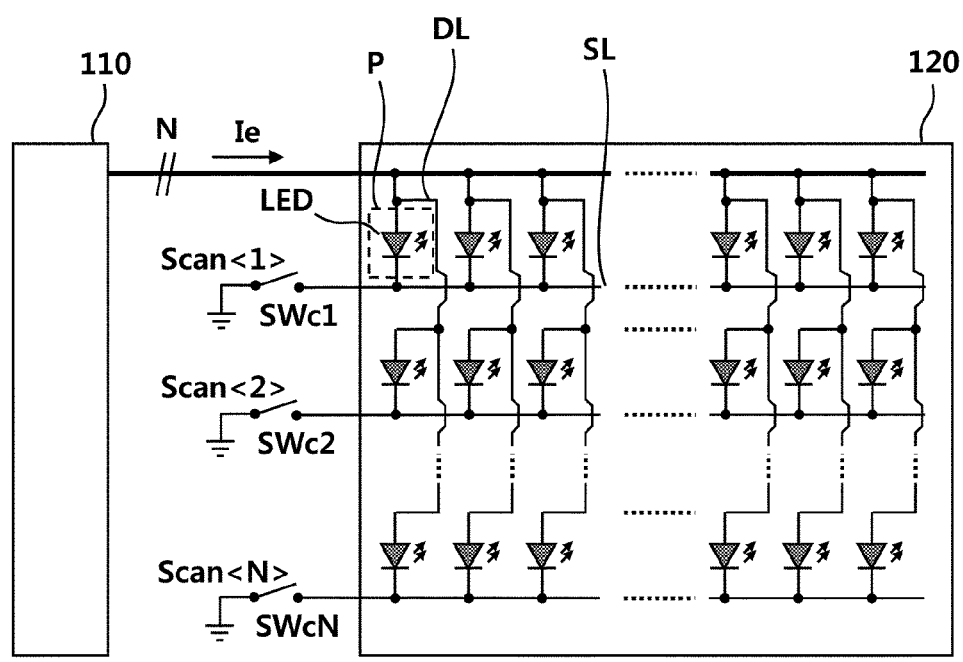
FIG. 1 is a configuration diagram of a display device according to an embodiment.

FIG. 1 is a configuration diagram of a display device according to an embodiment.

Referring to FIG. 1, a display device 100 may comprise a driving device 110 and a panel 120.

In the panel, a plurality of pixels P may be disposed in a first direction (for example, in a horizontal direction in FIG. 1) and a second direction (for example, in a vertical direction in FIG. 1) to form a matrix.

Each pixel P may comprise at least one light emitting diode (LED) and the brightness of a pixel P may be determined by the brightness of an LED.

In the panel 120, driving lines DL and scan lines SL may be disposed. A driving line Dl may connect one sides of pixels along the second direction and a scan line may connect the other sides of the pixels along the first direction. For example, an anode side of an LED disposed in a pixel P may be electrically connected with a driving line DL and a cathode side of the LED may be electrically connected with a scan line SL. In terms that cathode sides of LEDs are connected in common, a structure shown in FIG. 1 may be referred to as a common cathode structure, however, the present disclosure is not limited thereto.

The scan lines SL may respectively comprise scan switches SWc1, SWc2, . . . , SWcN and a scan line SL through which a driving current Ie is supplied may be determined depending on an opening or a closing of a scan switch SWc1, SWc2, . . . , SWcN.

Figure 2:
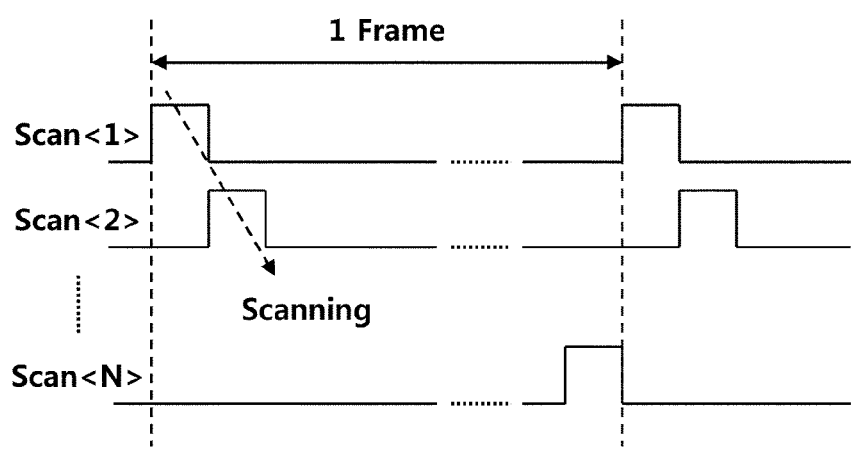
FIG. 2 is a diagram showing waveforms of scan signals in a display device according to an embodiment.

FIG. 2 is a diagram showing waveforms of scan signals in a display device according to an embodiment.

Referring to FIG. 1 and FIG. 2, in every frame, scan signals Scan<1>, Scan<2>, . . . , Scan<N> may sequentially be supplied to the respective scan switches SWc1, SWc2, . . . , SWcN. According to such scan signals Scan<1>, Scan<2>, . . . , Scan<N>, driving currents Ie may sequentially be supplied respectively to a first scan line, a second scan line, . . . , a Nth scan line.

A scan line SL may be connected to a low voltage part such as a ground in the display device 100. The scan switches SWc1, SWc2, . . . , SWcN may be disposed in the panel 120, in a separate substrate, or, depending on an embodiment, inside the driving device 110.

The scan signals Scan<1>, Scan<2>, . . . , Scan<N> may be supplied by the driving device 110 or by a separate control device.

The brightness of an LED disposed in each pixel P may be determined depending on an amount of driving power supplied within a predetermined time. An LED may be driven in a pulse width modulation (PWM) way and the brightness of an LED may be determined according to a rate of a turn-on time in a PWM control time. When an LED is turned on by a driving current Ie, a forward voltage may be formed in the LED. When the forward voltage is multiplied by the driving current Ie to obtain a result and such results during the turn-on time within the PWM control time are accumulated, an amount of driving power supplied to the LED may be obtained and such an amount of driving power may determine the brightness of the LED. When supposing that the levels of a forward voltage and a driving current Ie of an LED are fixed variables, the amount of driving power may be considered to be proportional to the turn-on time in the PWM control time. According to such principle, the driving device 110 may control the brightness of an LED and a pixel P by controlling the turn-on time in the PWM control time.

The driving device 110 may comprise a plurality of (N) channels connected with driving lines DL and each channel may supply a driving current Ie to each pixel P.

Meanwhile, when a pixel P has a defect, a voltage, different from one when the pixel is in a normal condition, may be formed in the pixel P. For example, when a pixel has a defect, a forward-direction voltage of an LED may be lower than that when the pixel is in a normal condition. The driving device 110 may sense such a voltage formed in the pixel P and detect the defect of the pixel P based on the sensed voltage.

Figure 3:
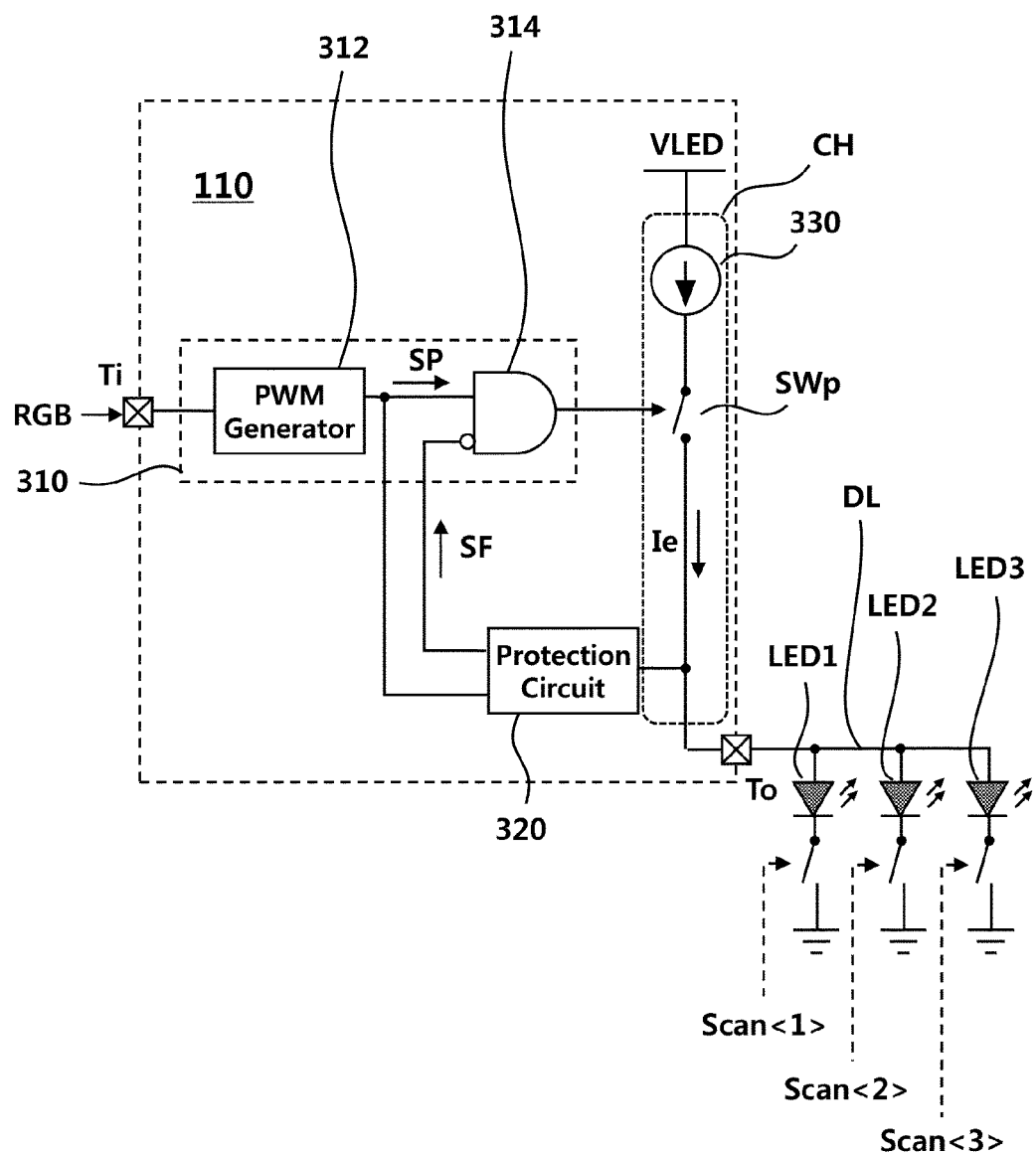
FIG. 3 is a diagram showing a configuration of a driving device according to an embodiment.

FIG. 3 is a diagram showing a configuration of a driving device according to an embodiment.

Referring to FIG. 3, the driving device 110, in terms of inputs and outputs, may comprise an input terminal Ti, through which image data RGB is inputted, and an output terminal To, through which a driving current Ie, controlled by a greyscale value included in the image data RGB, is outputted. The driving device 110 may comprise a driving circuit 310 and a protection circuit 320.

The driving circuit 310 may drive a plurality of LEDs LED1, LED2, LED3 respectively in different times according to scan signals Scan<1>, Scan<2>, Scan<3> using one channel CH. For example, the driving circuit 310 may drive, using one channel CH, a first LED LED1 in a first scan time when a first scan signal Scan<1> is supplied, a second LED LED2 in a second scan time when a second scan signal Scan<2> is supplied, and a third LED LED3 in a third scan time when a third scan signal Scan<3> is supplied.

The one channel CH may comprise a driving current source 330 and a driving switch SWp disposed in series and an output of the one channel may be connected with the output terminal To.

The driving circuit 310 may generate a PWM signal SP to control the brightness of LED LED1, LED2, LED3 according to image data RGB or a control signal received from an external device and may control a turn-on time of a driving switch SWp of each channel CH according to the PWM signal SP. When a driving switch SWp is turned on, a driving current Ie outputted from the driving current source 330 may be supplied to LEDs LED1, LED2, LED3 via the output terminal To and a driving line DL.

The driving circuit 310 may comprise a PWM generator 312 to convert image data RGB including a greyscale value of each pixel into a PWM signal SP. In addition, the driving circuit 310 may further comprise an AND logic element 314. The AND logic element 314 may perform an AND operation with respect to a PWM signal SP and a protection signal SF or an inverted signal of the protection signal SF and output its result. According to such an AND operation, a PWM signal SP for a driving switch SWp may stop being supplied.

The protection circuit 320 may supply a protection signal SF to the driving circuit 310 to turn off a driving switch SWp or to keep the driving switch SWp in a turned-off state.

The protection circuit 320 may sense a voltage of a pixel, determine whether or not the pixel is defective using the sensed voltage, and generate a protection signal SF according to a determination result. For example, the protection circuit 320 may sense a forward-direction voltage of an LED LED1, LED2, LED3 or a voltage corresponding to the forward-direction voltage thereof and determine whether or not the LED LED1, LED2, LED3 is defective using the sensed voltage. Subsequently, the protection circuit 320 may generate a protection signal SF according to this determination result.

The protection circuit 320 may sense a voltage formed in an output of each channel CH, for example, a voltage formed in the output terminal To. An output of each channel CH may be connected with anode sides of LEDs LED1, LED2, LED3. In this case, a voltage formed in an output of each channel CH may be identical to a voltage formed in an anode side of each LED LED1, LED2, LED3. In such an example, when cathode sides of the LEDs LED1, LED2, LED3 are connected with a ground, a voltage formed in an output of each channel CH may be substantially identical to a forward-direction voltage of each LED LED1, LED2, LED3.

The protection circuit 320 may compare a sensed voltage with one voltage and, in a case when the sensed voltage differs from the one voltage by at least a predetermined amount, determine that a corresponding pixel or a corresponding LED LED1, LED2, LED3 is defective. Here, the protection circuit 320 may set a sensed voltage in a previous time as the one voltage, which is a comparative object.

For example, the protection circuit 320 may sense a first voltage corresponding to a forward-direction voltage of the first LED LED1 in the first time and a second voltage corresponding to a forward-direction voltage of the second LED LED2 in the second time. Subsequently, the protection circuit 320 may set the first voltage as a voltage, which is a comparative object and compare the second voltage with the first voltage to determine whether or not the second LED LED2 is defective.

Referring to FIG. 3, the first scan signal Scan<1>, the second scan signal Scan<2>, and the third scan signal Scan<3> may sequentially be supplied. The protection circuit 320 may sense the first voltage corresponding to a forward-direction voltage of the first LED LED1 in the first scan time when the first scan signal Scan<1> is supplied through one channel CH, the second voltage corresponding to a forward-direction voltage of the second LED LED2 in the second scan time when the second scan signal Scan<2> is supplied through the one channel CH, and a third voltage corresponding to a forward-direction voltage of the third LED LED3 in the third time when the third scan signal Scan<3> is supplied through the one channel CH.

The protection circuit 320 may compare a voltage sensed in each scan time with a comparative object voltage and determine whether or not a pixel or an LED corresponding to each scan time is defective according to a comparison result. Here, the protection circuit 320 may generate a comparative object voltage using a voltage sensed in one scan time among previous scan times. For example, the protection circuit 320 may generate a comparative object voltage using the first voltage in the first scan time and compare a generated comparative object voltage with the second voltage in the second scan time. Subsequently, the protection circuit 320 may generate a comparative object voltage using the second voltage in the second scan time and compare a generated comparative object voltage with the third voltage in the third scan time. In addition, the protection circuit 320 may subsequently generate a comparative object voltage using the third voltage in the third scan time and compare a generated comparative object voltage with the first voltage in the first scan time.

A comparative object voltage may be stored and updated. The protection circuit 320 may store a sensed voltage as it is or a voltage obtained by deducting a predetermined voltage from the sensed voltage to form a comparative object voltage and update the comparative object voltage in every scan time.

In a case when a sensed voltage is lower than a comparative object voltage, the protection circuit 320 may determine that a corresponding LED is defective. When an LED LED1, LED2, LED3 is normally driven, its forward-direction voltage is maintained in at least a predetermined level. For this reason, when the forward-direction voltage is lower than a predetermined voltage (a comparative object voltage), this may mean that the LED is in a short-circuit state or in an incomplete short-circuit state. The protection circuit 320 may check a state of an LED LED1, LED2, LED3 by comparing a sensed voltage with a comparative object voltage in every scan time.

A forward-direction voltage of an LED may generally be maintained in a predetermined level, for example, 2-3V. For this reason, a conventional driving device determines whether or not an LED is in a short-circuit state by measuring a forward-direction voltage of the LED and comparing the measured voltage with a fixed reference voltage. However, a forward-direction voltage of an LED may be changed due to aging of the LED. Nevertheless, a conventional method cannot reflect such a change in the forward-direction voltage. When a forward-direction voltage an LED is lowered due to the aging of the LED, a driving device may determine that the LED is defective even when the LED is in normal condition. To minimize such a problem, a conventional driving device tends to set a reference voltage, which is a comparative object voltage, to be low. However, when a reference voltage is low, there could be another problem in which an incomplete short-circuit state of an LED cannot be sensed. In other words, a state, in which a forward-direction voltage is lower than a voltage when the LED is in a normal state, but has a predetermined value, cannot be sensed.

In order to resolve such a problem, the driving device according to an embodiment may generate a comparative object voltage reflecting a current state of an LED. For example, the driving device according to an embodiment may generate a comparative object voltage using voltages sensed in previous scan times in one channel. In other words, the driving device according to an embodiment may generate a representative value of voltages sensed in previous scan times as a comparative object voltage. Here, a representative value may be an average value, a median value, a maximum value, or the like.

Figure 4:
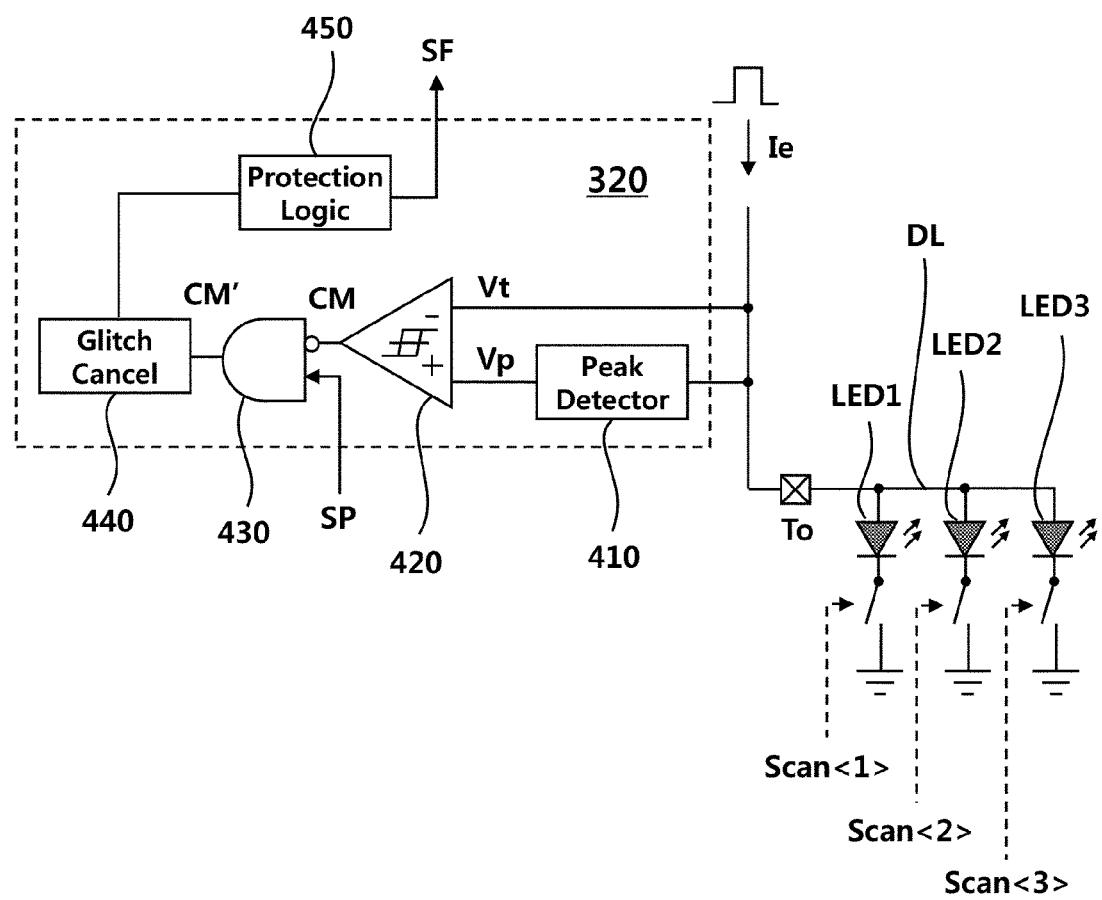
FIG. 4 is a diagram showing a configuration of a protection circuit according to an embodiment.

FIG. 4 is a diagram showing a configuration of a protection circuit according to an embodiment.

Referring to FIG. 4, the protection circuit 320 may comprise a peak detecting circuit 410, a comparing circuit 420, an AND logic element 430, and a glitch removal circuit 440, and a protection logic circuit 450.

Through one terminal, for example a negative input terminal, of the comparing circuit 420, a voltage formed in a position of a pixel, for example a voltage formed an anode of an LED LED1, LED2, LED3, may be inputted as a first voltage. A first voltage may be inputted through the one terminal of the comparing circuit 420 in every scan time.

The peak detecting circuit 410 may sense a maximum one among first voltages of respective pixels as a second voltage through a path where a voltage drop element is disposed. Subsequently, the peak detecting circuit 410 may input the second voltage through another terminal, for example, a positive input terminal of the comparing circuit 420.

The comparing circuit 420 may compare a first voltage with the second voltage and, in a case when the first voltage is lower than the second voltage, it may determine that a current pixel is defective. Subsequently, the comparing circuit 420 may output a determination result in a form of a comparative signal CM. The comparative signal CM may have a high level when a pixel is defective and have a low level when a pixel is in a normal condition. Otherwise, the comparing circuit 420 may output a comparative signal CM of a low level when a pixel is defective, that is, when a first voltage is lower than a second voltage, and output a comparative signal CM of a high level when a pixel is in a normal condition.

The comparing circuit 420 may comprise a comparator to generate a comparative signal CM. The comparator may receive a first voltage and a second voltage as inputs and output a comparative signal CM. Since the comparator comprises a hysteresis loop therein, it may output a stable signal even when the first voltage and the second voltage have similar levels.

The AND logic element 430 may generate a combination signal CM' by combining a comparative signal CM and a PWM signal SP by an AND operation. The protection circuit 320 may perform an AND operation with respect to a comparative signal CM and a PWM signal SP to form a combination signal CM'. The AND operation makes the comparative signal CM pass only in a section where the PWM signal SP has a high level. In this way the protection circuit 320 may generate a combination signal CM'. The protection circuit 320 may determine whether or not a pixel is defective in a section where an LED LED1, LED2, LED3 is driven and the section where an LED LED1, LED2, LED3 is driven may be perceived as a section where a PWM signal SP has a high level.

The glitch removal circuit 440 may generate a stable signal by removing glitches included in the combination signal CM' and the protection logic circuit 450 may generate a protection signal SF by performing a final process with respect to a signal transmitted via a series of components. The protection logic circuit 450 may generate a protection signal SF by inverting an inputted signal or by adding another supplementary determination.

Figure 5:
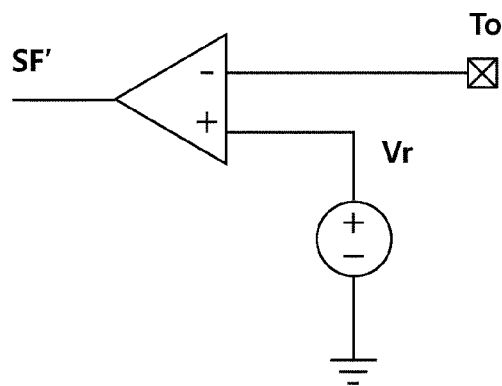
FIG. 5 is a configuration diagram of a general protection circuit.
Figure 6:
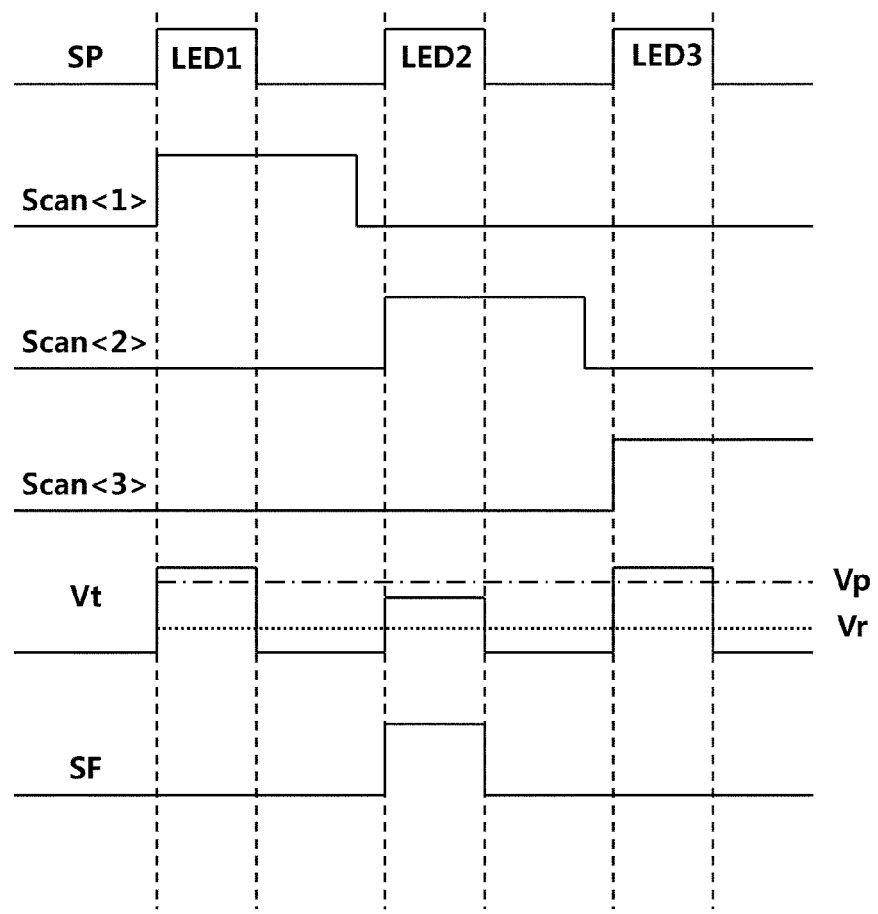
FIG. 6 is a diagram showing main waveforms of a driving device according to an embodiment.

FIG. 5 is a configuration diagram of a general protection circuit and FIG. 6 is a diagram showing main waveforms of a driving device according to an embodiment.

Referring to FIG. 4, FIG. 5, and FIG. 6, a second voltage Vp formed in the protection circuit may have a level higher than a reference voltage Vr used for a general protection circuit. For this reason, the driving device according to an embodiment may detect a pixel even in an incomplete short-circuit state.

A general protection circuit 50 shown in FIG. 5 may generate a protection signal SF' by comparing a voltage sensed using an output terminal To with a predetermined reference voltage Vr. However, such a general protection circuit 50 may not set the reference voltage Vr high because a drop of a sensed voltage due to aging of a pixel needs to be considered. For this reason, the general protection circuit 50 sets the reference voltage Vr low. However, such a low reference voltage Vr may hinder a pixel in an incomplete short-circuit state from being detected as described above.

Since the driving device according to an embodiment uses a voltage reflecting a current state of an LED as a comparative object voltage, the level of the voltage may be relatively high. In a case when a second voltage, which is a comparative object voltage, is high, and a sensed voltage is lowered later due to aging of an LED, since the second voltage is also lowered, a mis-determination of a defect due to the aging of an LED may be prevented.

Referring to FIG. 4 and FIG. 6 in order to look into a specific example of a drive, in a time when a first scan signal Scan<1> is supplied, a driving current Ie may flow into a first LED LED1. A voltage Vt formed in an output terminal in a first scan time, and particularly in a time when a PWM signal SP is in a high level, may correspond to a forward-direction voltage of the first LED LED1. The driving device may compare the voltage Vt (a first voltage) with a peak voltage Vp (a second voltage) generated in the peak detecting circuit 410 to generate a protection signal SF. Since the voltage Vt (the first voltage) formed in the output terminal in the first scan time is higher than the peak voltage Vp (the second voltage), the protection signal SF may have a low level. Meanwhile, in a second scan time, the voltage Vt (the first voltage) formed in the output terminal is lower than the peak voltage Vp (the second voltage). In this case, the protection signal SF may have a high level indicating that a corresponding pixel is defective.

Figure 7:
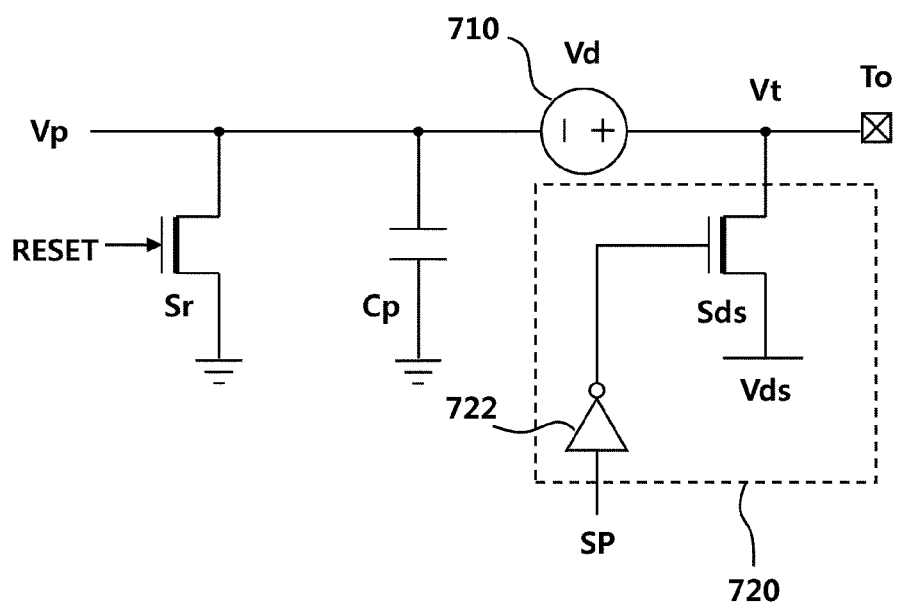
FIG. 7 is a configuration diagram of a peak detecting circuit according to an embodiment.

FIG. 7 is a configuration diagram of a peak detecting circuit according to an embodiment.

Referring to FIG. 7, the peak detecting circuit 410 may be connected with the output terminal To on its one side so as to receive a voltage Vt formed in the output terminal To and may output a peak voltage Vp through its other side.

The peak detecting circuit 410 may comprise a voltage drop element 710 disposed between the one side and the other side. The peak voltage Vp may be formed by dropping the voltage Vt formed in the output terminal To by a predetermined voltage Vd.

The peak detecting circuit 410 may further comprise a capacitor Cp in order to store the peak voltage Vp. The peak voltage Vp may be stored in the capacitor Cp in one scan time and used as an input voltage for the comparing circuit in another scan time.

Since the capacitor Cp has an internal resistance or a leak resistance, the level of a voltage stored therein may drop over time. However, additional electric charges may be supplied from the output terminal To in every scan time, and thus, the voltage may constantly be maintained in a predetermined level.

In a case when the natural discharge rate of the capacitor Cp is too slow, a voltage stored in the capacitor Cp may not properly reflect a current state of an LED. In order to remedy such a problem, a reset switch Sr may be disposed in parallel with the capacitor Cp. The driving device may periodically or non-periodically turn on the reset switch Sr to discharge electric charges stored in the capacitor Cp and to change a peak voltage Vp stored in the capacitor Cp by a new peak voltage.

To the output terminal To, a sampling time restriction circuit 720 may be connected. The sampling time restriction circuit 720 may allow sensing a voltage formed in an LED as it is in a time when a PWM signal SP has a high voltage level. On the contrary, the sampling time restriction circuit 720 may force a voltage in the output terminal To to be maintained as a predetermined voltage Vds to prevent the voltage in the output terminal To from affecting the peak voltage Vp in a time when the PWM signal Sp has a low voltage level.

In addition, the sampling time restriction circuit 720 may output a predetermined voltage Vds to the output terminal To so as to maintain a voltage of a driving line to be constant.

The sampling time restriction circuit 720 may comprise a restriction switch Sds to control the connection between the output terminal To and the predetermined voltage Vds and a gate driving circuit 722 to control a gate of the restriction switch Sds using an inverse signal of the PWM signal Sp.

Figure 8:
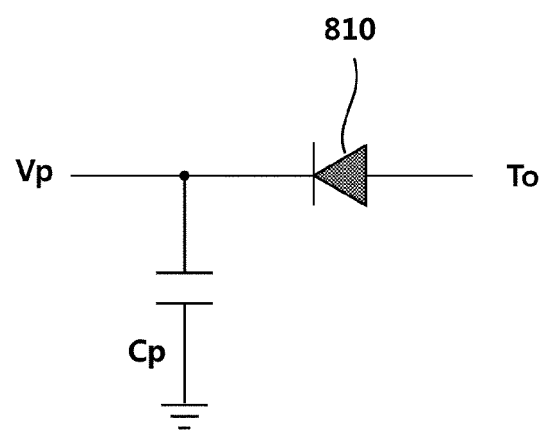
FIG. 8 is a diagram showing a first example of a voltage drop element according to an embodiment.
Figure 9:
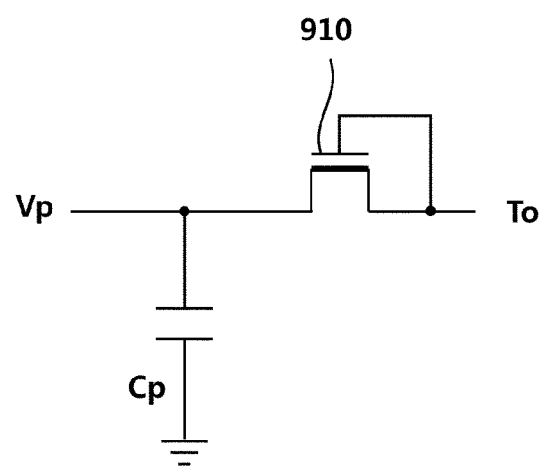
FIG. 9 is a diagram showing a second example of a voltage drop element according to an embodiment.

FIG. 8 is a diagram showing a first example of a voltage drop element according to an embodiment and FIG. 9 is a diagram showing a second example of a voltage drop element according to an embodiment.

Referring to FIG. 8, the voltage drop element may comprise at least one diode 810. Here, an anode of the diode 810 may be connected with the output terminal To and a cathode thereof may be connected with the capacitor Cp.

Referring to FIG. 9, the voltage drop element may comprise at least one diodeconnected transistor 910. Here, a gate and a drain of the diodeconnected transistor 910 may be connected with each other, the drain may be connected with the output terminal To, and a cathode may be connected with the capacitor Cp. The transistor 910 may be a field effect transistor (FET).

FIG. 10 is a flow diagram of a method of driving an LED according to an embodiment.

Referring to FIG. 10, the LED driving device may store a comparative object voltage by channel (S1000). The comparative object voltage may be stored in the capacitor or in another element. Each channel may be connected with one driving line and the one driving line may be connected with a plurality of LEDs.

The LED driving device may drive the plurality of LEDs respectively in different times using one channel (S1002). The plurality of LEDs may be connected with the one driving line respectively in different times according to scan signals and receive a driving current from the one channel.

The LED driving device may sense a forward-direction voltage of each LED using a channel in every driving time (S1004).

Subsequently, the LED driving device may compare a voltage, obtained by deducting a predetermined voltage from a sensed voltage, with the comparative object voltage (S1006) and, when the voltage, obtained by deducting a predetermined voltage from a sensed voltage, is higher than the comparative object voltage (YES in S1006), the LED driving device may update the comparative object voltage by the voltage obtained by deducting a predetermined voltage from a sensed voltage (S1008) in every driving time.

The comparative object voltage may be stored in the capacitor. However, due to a parasitic element of the capacitor, the comparative object voltage may naturally be discharged and, due to such natural discharge, the comparative object voltage may frequently be updated.

The comparative object voltage may periodically or non-periodically be reset. In order to prevent the comparative object voltage from being reset at a same time point in every frame, the comparative object voltage may be reset at an interval different from an interval for frames.

After the comparative object voltage is determined, the LED driving device may compare a sensed forward-direction voltage with the comparative object voltage (S1010) and, when the sensed forward-direction voltage is lower than the comparative object voltage (YES in S1010), the LED driving device may determine that a relevant LED is defective and generate a protection signal (S1012).

In the above, a technique for driving LEDs according to an embodiment is described. Such an embodiment allows detecting a defect of a pixel in an LED display device, determining a short circuit of a pixel in an LED display device, and detecting a pixel in an incomplete short circuit in an LED display device.

What is claimed is:

1. A light emitting diode (LED) driving device, comprising:
    a driving circuit to drive a plurality of LEDs respectively in different times according to scan signals; and
    a protection circuit to sense a first voltage corresponding to a forward-direction voltage of a first LED among the plurality of LEDs in a first time, to sense a second voltage corresponding to a forward-direction voltage of a second LED among the plurality of LEDs in a second time, and to determine a state of the second LED by comparing a voltage related to the first voltage with a voltage related to the second voltage.

2. The LED driving device of claim 1, wherein the first LED and the second LED differ from each other and are connected with one driving line or one channel.

3. The LED driving device of claim 1, wherein the first voltage is a voltage related to an anode side of the first LED, and the second voltage is a voltage related to an anode side of the second LED, and the protection circuit determines a state of the second LED by comparing a voltage, obtained by deducting a predetermined voltage from the first voltage, with the second voltage.

4. The LED driving device of claim 1, wherein the first voltage corresponds to a highest one among voltages formed in anode sides of the plurality of LEDs.

5. An LED driving device comprising:
    a driving circuit to sequentially drive a plurality of pixels, each comprising an LED, by scan line; and
    a protection circuit to sense a voltage formed in a position of each pixel as a first voltage, to sense a highest voltage among first voltages for pixels as a second voltage via a path in which a voltage drop element is disposed, and to determine a state of each pixel by comparing the first voltage and the second voltage,
    wherein the first voltage is a voltage related to an anode side of an LED disposed in each pixel.

6. The LED driving device of claim 5, wherein the voltage drop element is a diode element or a diode connected field effect transistor (FET) element.

7. The LED driving device of claim 5, wherein the protection circuit inputs the first voltage and the second voltage into a comparator comprising a hysteresis loop and determines a state of each pixel according to an output from the comparator.

8. The LED driving device of claim 7, wherein the driving circuit comprises a switch to adjust brightness of each pixel according to a pulse width modulation (PWM) signal and the switch is controlled to be on or off according to a signal in which a signal outputted from the comparator and the PWM signal are combined.

9. The LED driving device of claim 5, wherein the second voltage is stored in a capacitor and reset according to a periodic or non-periodic turn-on of a reset switch connected in parallel with the capacitor.

10. The LED driving device of claim 5, wherein the plurality of pixels and the driving circuit are connected by a driving line and the protection circuit senses the first voltage or the second voltage using the driving line in a time when driving currents are supplied to the plurality of pixels and supplies a predetermined voltage to the driving line in a time when driving currents are not supplied to the plurality of pixels, wherein the predetermined voltage has a level by which the plurality of pixels are not turned on.

11. An LED driving method, comprising:
  driving a plurality of LEDs respectively in different times using a channel;
  sensing a forward-direction voltage of each LED using the channel in every driving time;
  storing a comparative object voltage and, when the forward-direction voltage in one driving time is higher than the comparative object voltage by at least a predetermined voltage, updating the comparative object voltage using a voltage obtained by deducting the predetermined voltage from the forward-direction voltage in the one driving time; and
  comparing the forward-direction voltage with the comparative object voltage to determine a state of the LED,
  wherein the forward-direction voltage is a voltage related to an anode side of the each LED.

12. The LED driving method of claim 11, wherein the comparative object voltage is stored in a capacitor and naturally discharged by a parasitic element.

13. The LED driving method of claim 11, further comprising generating a protection signal when the LED is determined to be defective and identifying a position of the LED determined to be defective or storing the position by identifying a time point when the protection signal is generated.

14. The LED driving method of claim 11, further comprising resetting the comparative object voltage, wherein the comparative object voltage is reset at an interval different from an interval for frames.

\* \* \* \* \*